United States Patent [19]

Epe

[11] Patent Number: 4,651,768

[45] Date of Patent: Mar. 24, 1987

[54] SERVOVALVE FOR PIPE FLANGE CONNECTION

[76] Inventor: Alfred Epe, Winkhauser Weg 148, D-4330 Mühlheim, Fed. Rep. of Germany

[21] Appl. No.: 867,250

[22] Filed: May 23, 1986

[30] Foreign Application Priority Data

May 25, 1985 [DE] Fed. Rep. of Germany ... 3519034[U]

[51] Int. Cl.$^4$ .................. F16K 1/12; F16K 31/383
[52] U.S. Cl. .................. 137/219; 137/220; 137/489.3; 251/35
[58] Field of Search .................. 137/219, 220, 489.3; 251/35

[56] References Cited

U.S. PATENT DOCUMENTS 4,117,859 10/1978 Illy .................. 137/219

FOREIGN PATENT DOCUMENTS 2032822 1/1972 Fed. Rep. of Germany .
1568846 4/1969 France .

Primary Examiner—Gerald A. Michalsky
Attorney, Agent, or Firm—Karl F. Ross; Herbert Dubno

[57] ABSTRACT

The flow controlling valve, particularly mounted in a pipe flange structure, comprises a cylindrical housing, a flow passage whose cross section is controllable, a valve seat, and a valve member and at least one auxiliary valve mounted in the housing. The valve seat is formed as a mushroom member whose mushroom head has an edge with an adjacent seating surface and whose stem is connected to at least one supporting cross piece extending across the flow passage. The valve member is a spring-loaded hollow piston guided in the housing whose interior space forms the flow passage which is mounted with its inner edge positionable on the seating surface of the mushroom head. The auxiliary valve has a spring-loaded auxiliary stopper member with an associated auxiliary valve seat which controls a flowing medium branching from the main flow by a metering element. The mushroom member is connected with its mushroom stem on a supporting cross piece or pieces which is or are elastically deformable and an outer section of the hollow piston forms a circular gap between it and the housing which serves as the metering element.

12 Claims, 4 Drawing Figures

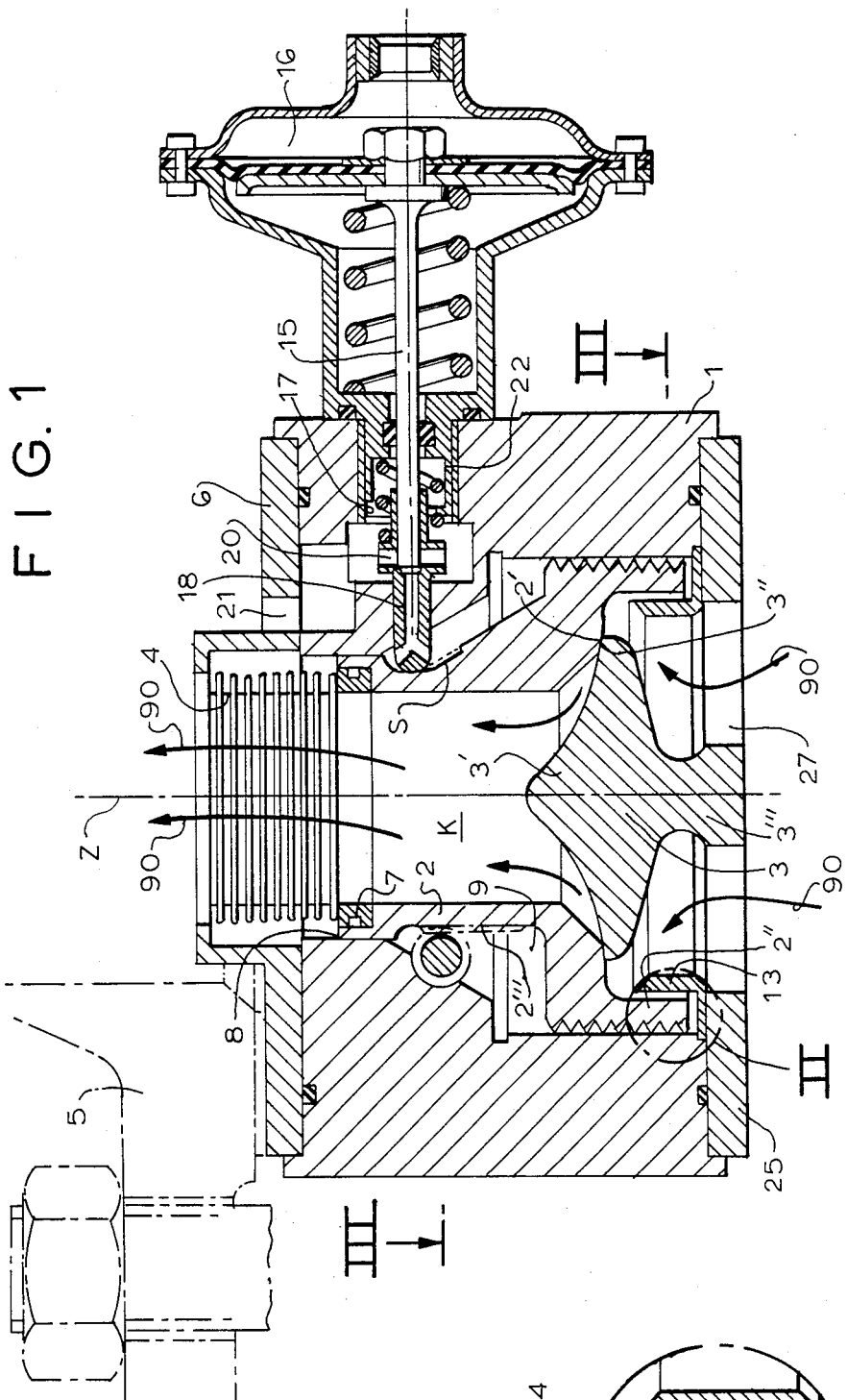
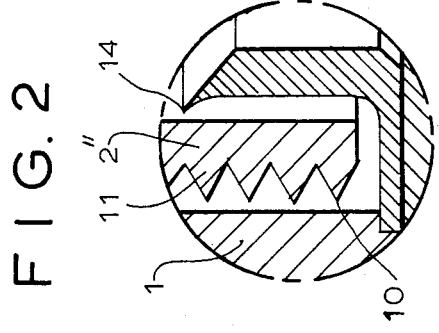
FIG. 1
FIG. 2

SERVOVALVE FOR PIPE FLANGE CONNECTION

FIELD OF THE INVENTION

My present invention relates to a flow-control valve for fluids and, more particularly, to a servocontrol valve adapted to be mounted in a pipe flange connection.

BACKGROUND OF THE INVENTION

A flow control servovalve can comprise a cylindrical housing, a controllable cross section flow duct or passage, a valve seat, and a valve member and at least one auxiliary valve mounted in the housing.

The valve seat can be formed as a mushroom-shaped member whose mushroom head has an edge forming a seating surface and whose stem is connected to at least one supporting cross piece extending across the flow duct.

The valve member can be a spring-loaded hollow piston guided in the housing whose interior space forms the flow duct which is mounted with its inner edge positionable on the seating surface of the mushroom head.

The auxiliary or pilot valve has a spring-loaded auxiliary stopper member with an associated auxiliary valve seat which controls a flowing medium branching from the main flow by a metering element.

In the valve of French Pat. No. 15 68 846 the mushroom member is pear shaped and is mounted with its pear neck acting as the mushroom stem on a rigid cross piece which extends practically over the entire length of the pear neck. This structure has a large inertia and is not elastically deformable. The cylindrical piston is guided with its outer edge over interposed sealing members in the associated cylindrical housing.

The metering or throttling elements comprise metering ducts and metering holes. In the described structure adhesion can occur between the mushroom member and the valve seat which is highly disturbing because the valve should be sensitive and operate reliably with the pressure drop developed through the return action of the cylindrical piston. The small forces involved however often are not sufficient, because of this adhesion, to release the tube like valve body from the closed position.

OBJECTS OF THE INVENTION

It is an object of my invention to provide an improved flow control servovalve, particularly a servovalve mounted on a pipe flange structure.

It is also an object of my invention to provide an improved flow controlling valve in which a disturbing adhesion of the valve member to the valve seat does not arise and the valve member is easily lifted from the valve seat in normal operation.

SUMMARY OF THE INVENTION

These objects and others which will become more readily apparent hereinafter are attained in a flow control servovalve, particularly adapted to be mounted in a pipe flange structure, comprising a cylindrical housing, a flow passage whose cross section is controllable, a valve seat, and a valve member and at least one auxiliary or pilot valve mounted in a radial bore in the housing.

The valve seat is formed as a mushroom member whose mushroom head has an edge with an adjacent seating surface and whose stem is connected to at least one supporting cross piece extending across the flow passage. The valve member is a spring-loaded hollow piston guided in the housing whose interior space forms the flow passage which is mounted with its inner edge positionable on the seating surface of the mushroom head.

The auxiliary valve has a spring-loaded auxiliary valve member with an associated auxiliary valve seat which controls a flowing medium branching from the main flow by reason of the provision of a metering element.

According to the invention the mushroom member is mounted with its mushroom stem on at least one supporting cross piece which is elastically deformable and an outer section of the hollow piston forms a circular throttle gap communicating with the annular clearance between it and the housing which serves as the metering means.

That a hollow piston can form a circular gap between it and the housing of a valve which can act as a metering element of the valve is of course known. This has been taught in German Open Patent Application DE-OS 20 32 822.

The above combination however brings some particularly beneficial effects: On closing the controlling valve the complete outlet pressure loads the mushroom member. Then a controlling flow gradually begins. The intermediate pressure drops to an equilibrium value which is determined by the active aspect ratio of the pressure i.e. the ratios of the surface acted upon in opposite directions by the pressure.

Then the seating surface springs back and moves the cylindrical valve body in front of it from the valve seat. Thus adhesion does not impede the valve action.

It is also helpful that the edge of the hollow piston be used to define a circular gap between the piston and the housing and thus form a metering element of the valve. This provides a degree of freedom for the valve body which helps meet tolerance requirements, and of course transverse to the axis of the flow. That occurs also because this valve body, despite its substantially rotationally symmetric structure, at the beginning of the controlled flow necessarily has unsymmetrical flows which produces statistically different pressures at the valve body.

The hollow piston can have an outer section forming a metering element in the vicinity of an inner shoulder and the outer section is provided with a circumferential toothed profile. Furthermore the metering element has a cylindrical inlet guard with supporting pieces which forms an extension of the circular gap of the metering element into the hollow piston.

Advantageously the flow controlling valve according to my invention is equipped with a pressure reducer as well as a relief valve. It is also possible to provide an adjustable flow controlling valve according to my invention whose flow control is modulated by a pneumatic externally driven auxiliary or pilot valve.

BRIEF DESCRIPTION OF THE DRAWING

The above and other objects, features and advantages of my invention will become more readily apparent from the following description, reference being made to the accompanying somewhat diagrammatic drawing in which:

FIG. 1 is an axial cross sectional view of a flow control servovalve according to my invention;

FIG. 2 is a magnified cutaway view of a portion II of the servovalve of FIG. 1;

SPECIFIC DESCRIPTION

Figure 3:
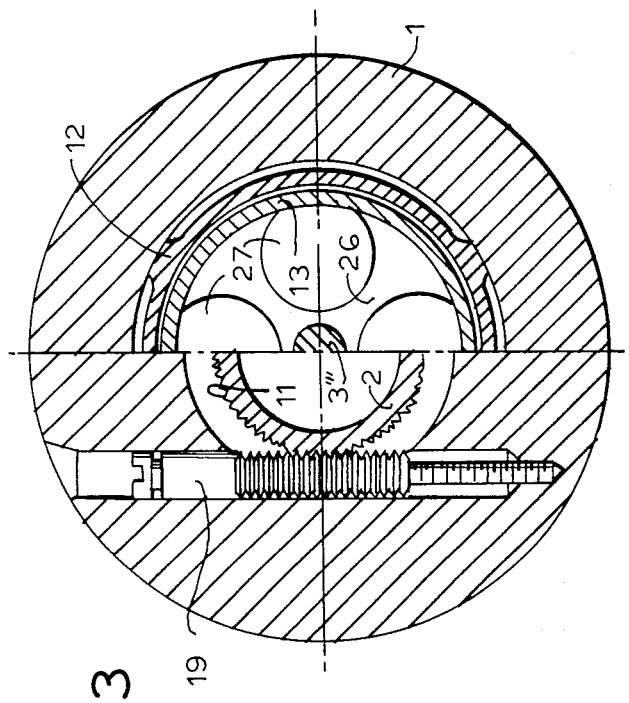
FIG. 3 is a transverse cross sectional view through the apparatus of FIG. 1 taken along the section line III—III of FIG. 1.

The servovalve shown in FIGS. 1, 2 and 3 comprises a cylindrical housing 1, in which a tube shaped hollow piston 2 is supported rotatably as a valve member which is axially shiftable against a valve seat 3. This valve is primarily for nonlubricating low viscosity fluids, since the principal location to be sealed at the outlet of the valve is provided with a sealing membrane 4, in the form of a bellows which is attached at one end to a mounting plate 6 clamped rigidly between the housing 1 and the pipe flange 5 and at the other end is connected to the hollow piston 2 which is the valve member or valve body by a sealing ring 7.

The fit 8 of the small-diameter portion of the hollow valve member 2 is only tight enough to guide the sliding of the hollow piston 2 relative to the housing 1.

The other end of the central interior chamber 9 must have a controllable reliable leak for providing flow control. This leak is effected by a circular gap 10 between the large-diameter portion of the hollow piston 2 and the housing 1 which provides a metered influx.

The resistance at this gap 10 can be raised by providing a toothed profile 11 (in axial section) on the surfaces forming the gap 10, e.g. on the outer periphery of the large diameter portion.

Exact guidance for the relative motions at this gap 10 is provided by the guiding lugs 12.

A protective inlet guard or sleeve 13, acting as a contaminant stripper, prevents dirt and other contaminants from entering the circular gap 10, since each accumulation of foreign bodies at the inlet edge 14 with the valve open is swept away by the flow forces as a result of the high flow rate.

The valve seat element is a mushroom member 3 whose mushroom head 3' has a seating surface 3" adjacent its edge and whose stem 3''' is mounted on at least one supporting cross piece 26. The valve body is a spring-loaded tube-shaped hollow piston 2 guided in housing 1. The interior space in this hollow piston 2 forms the flow passage K.

The hollow piston 2 is engageable with the seating surface 3" with an interior shoulder 2' and provides a narrow circular gap 10 with its outer section 2" opposing the housing 1 and thus a metering or throttling element.

Figure 4:
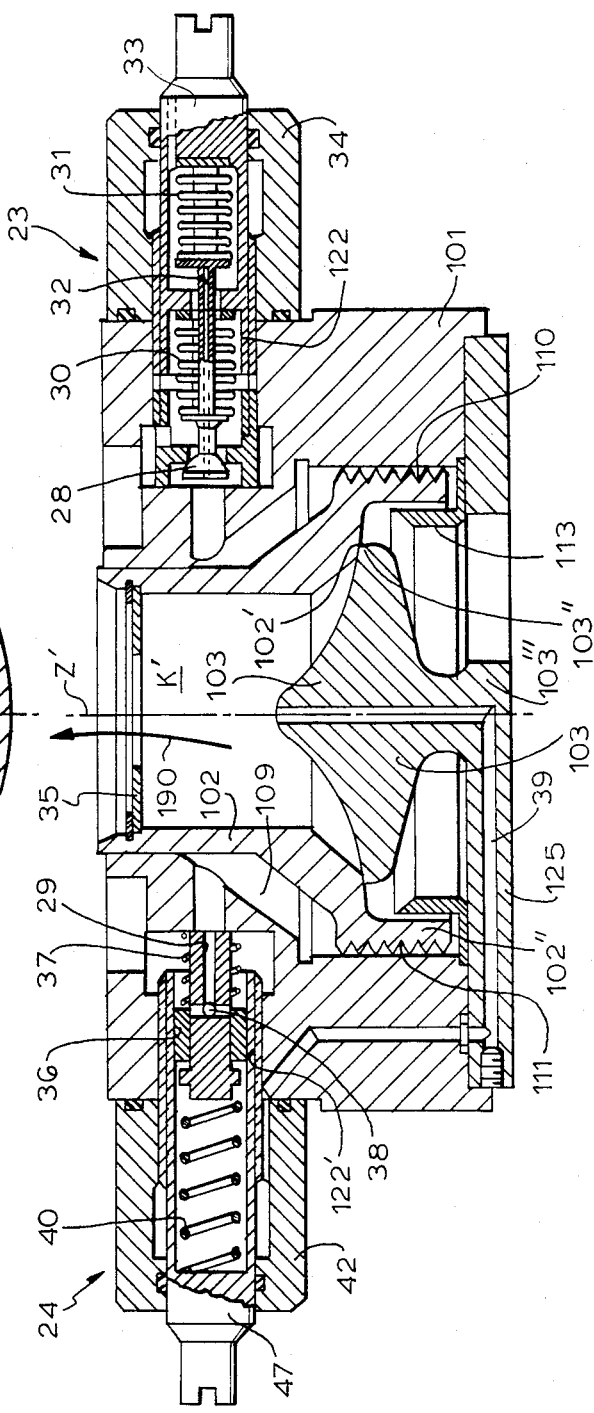
FIG. 4 is an axial cross sectional view of another embodiment of a flow control servovalve according to my invention.

The controlling valve should be sensitive in operation and reliably operated by the returning spring action of the hollow piston 2 (the spring action being provided by the sealing membrane 4 in the apparatus of FIG. 1; a similar or other spring can be used as desired in the embodiment of FIG. 4) with a given pressure drop. These small forces have often not been sufficient in the past, because of the adhesion effect, to release the tube shaped hollow piston 2 from the closed position.

Here help is provided by the elastically deformable supporting cross piece 26 mounted between the inlet openings 27.

With the flow controlling valve closed the valve seat member 28 in the pressure reducer or the valve stem 29 in the relief valve in the embodiment of FIG. 4 or auxiliary valve 20 may provide external control for the flow controlling valve so that pressure builds up in the central interior chamber 9 and accordingly the mushroom member 3 is under load. Then gradually a controlling flow occurs so that the central interior chamber pressure sinks to an equilibrium value which is determined by the aspect ratio of the acting pressures.

Thus the seating surface 3" springs back and moves the hollow piston 2 already in front of it from the valve seat 3" so that eventually adhesion on the side walls is overcome.

Frequently the controlling valves of the described structure are adjustable although that is not a necessary object of the invention. The embodiment shown in FIG. 1 shows such a valve. The hollow piston 2 has on its outer upper surface at least one principal regulating characteristic-controlling contour S running circumferentially engaged with an associated controlling pin 18 mounted in the housing 1. The cylindrical hollow piston 2 is rotatable with the aid of an adjusting screw 19 about its piston cylinder axis Z and because of that the regulating characteristic is changed.

The control shown in FIG. 1 which couples by the control bolt 18 under load provided by the spring 17 the position of the hollow piston 2 to the adjusting pin 15 of a drive (here shown as the pneumatic drive 16) is such that according to the angular position of the hollow piston 2 a regulating characteristic-controlling contour S on its outer wall surface with a spiral shaped course determines the opening of the valve relative to the adjusting pin 15.

Thus from the outside and during operation with the valve open by rotation of the adjusting screw 19 in engagement with a gear tooth system 2''' on the outside of the hollow piston 2 every possible transmission variant can be dialled in or selected, for example linear and equal percentage. According to the reaction of the entire control system, which is similar to the structure of a hydraulic copier, the hollow piston 2 follows the motion of the adjusting pin 15. The valve is controlled by the controlling flow modulated by the auxiliary valve 20 and the inlet metering circular gap 10 and which joins the main flow by passage 21 in the outlet of the valve 20.

The same radial bore threaded connector 22, which is used in the embodiment of FIG. 1 to mount the pneumatic diaphragm drive 16, can also be used with a variety of external and internal control devices, for example with the pressure reducer 23 (radial bore connector 122) or the flow regulator/relief valve combination 24 (radial bore connector 122') of FIG. 4. Likewise several threaded connectors can be used for several functions in the same housing (for example external control and pressure reduction or external control and relief and so forth) without loosening the valve from its pipe flange coupling.

FIG. 4 shows another embodiment of my valve with hollow piston 102 and housing 101 without the sealing membrane 4 and thus for viscous media. Of course FIG. 4 shows both a pressure reducer 23 and a relief valve 24 with flow control. In the pressure reduction the first bellows 30 (under pressure of the surrounding atmosphere) acting as a spring closes the auxiliary valve stopper member 28 with increasing pressure in a reverse motion. The second bellows 31 (with intermediate pressure being maintained by the passage 32) acts only for pressure adjustment on the vertical cone of the auxiliary valve seat member 28. Thus the pressure at the outlet is predetermined in a spring force adjustment by the rotating pin 33 of the first and second bellows 30 and 31, which correspondingly varies the desired value of the pressure in the tube shaped hollow piston 102. The sealing cap 34 acts also as a locking nut.

In cooperation with the restrictor 35 the so-called pressure balancer comprising ring piston 36 and captive spring 37 provides by uncovering the central chamber outlet port 38 a constant flow through the hollow piston 102 so that the pressure drop at the restrictor 35 remains unchanged. The restrictor outlet pressure is communicated to the front side of the ring piston 36 through the passage system 39. A simple relief valve is coupled with the flow regulator comprising the valve stem 29 maintained under compression by the spring 40 which brings the hollow piston 102 into the open position as soon as the outlet pressure at the valve stem 29 exceeds the compression exerted by the spring 40 set by the rotatable pin 41. On this side also the sealing cap 42 acts as both a sealing element and also a locking nut. The described "IN-LINE" construction allows an extraordinarily satisfactory pressure drop since changes in flow direction are kept to a minimum. Moreover these radially symmetric forms provide the advantage of economical manufacture (primarily rotatable parts) and greater strength under pressure (uniform deformation under pressure).

Parts shown in FIG. 4 which are very similar or the same as corresponding parts in the embodiment of FIGS. 1 and 2 are labelled with the reference number used for that part in FIG. 1 plus 100. For example the mushroom member 3 in FIG. 1 corresponds to the mushroom member 103 in the embodiment of FIG. 4. Such components have already been described sufficiently in the discussion of the embodiment of FIGS. 1 and 2.

The main flow through the valve is indicated in FIG. 1 by the arrows 90 and in FIG. 4 by the arrows 190.

I claim:

1. In a flow control servovalve, particularly for mounting in a pipe flange structure, comprising a housing, a flow passage whose cross section is controllable, a valve seat, a valve member and at least one auxiliary valve mounted in said housing, wherein said valve seat is formed as a mushroom member whose mushroom head has an edge with an adjacent seating surface and whose stem is connected to at least one supporting cross piece extending across said flow passage, wherein said valve member is a spring-loaded hollow piston guided in said housing whose interior space forms said flow passage and which is mounted with its inner edge positionable on said seating surface of said mushroom head, and wherein said auxiliary valve has a spring-loaded auxiliary stopper member with an associated auxiliary valve seat which controls a flowing medium branching from the main flow by a metering element, the improvement wherein:

said mushroom member is mounted with said stem on said supporting cross piece which is elastically deformable, and an outer section of said hollow piston forms a circular gap between said hollow piston and said housing which serves as said metering element.

2. The improvement according to claim 2 wherein said hollow piston has said outer section forming said metering element in the vicinity of an inner shoulder of said hollow piston and said outer section is provided with a circumferential toothed profile.

3. The improvement according to claim 1 wherein said metering element has an inlet guard with supporting members which forms an extension of said circular gap of said metering element into said hollow piston.

4. A flow control servovalve, particularly mounted in a pipe flange structure, comprising:

a housing;

a flow passage whose cross section is controllable across which at least one elastically deformable supporting cross piece extends;

a valve seat which is a mushroom member whose mushroom head has an edge with an adjacent seating surface and whose stem is connected to at least one of said elastically deformable supporting cross pieces extending across said flow passage;

a valve member which is a spring-loaded hollow piston guided in said housing whose interior space forms said flow passage and which is mounted with its inner edge positionable on said seating surface of said mushroom head; and at least one auxiliary valve mounted in said housing with a spring-loaded auxiliary stopper member and an associated auxiliary valve seat which controls a flowing medium branching from the main flow through said flow controlling valve through a metering element which is formed by a circular gap between an outer section of said hollow piston and said housing.

5. A flow controlling valve according to claim 4 wherein said outer section is provided with a circumferential toothed profile.

6. A flow controlling valve according to claim 4 wherein said metering element has an inlet guard with supporting members which forms an extension of said circular gap of said metering element into said hollow piston.

7. A flow controlling valve according to claim 4 wherein a pressure relief valve and a pressure reducer are also connected to said flow controlling valve.

8. A flow controlling valve according to claim 4 wherein said flow controlling valve is adjustable.

9. A flow controlling valve according to claim 8 wherein said hollow piston is rotatable by means of an adjusting screw and has at least one principal regulating characteristic-controlling contour on its outer upper surface running circumferentially and engaged to a controlling bolt of said auxiliary valve and said auxiliary valve further comprises a pneumatically adjustable drive which controls the position of an adjusting pin which is coupled with said control bolt which is spring-loaded.

10. An in-line flow-control valve insertable between flanges of a pipeline, said flow-control valve comprising:

a cylindrical body forming a valve housing and formed with an axial stepped bore having a large-diameter portion at an inlet side of said body, and a small-diameter portion at an outlet side of said body;

a hollow valve member axially shiftable in said bore, said valve member defining an annular clearance with said body and forming at said inlet side of said body a throttle gap communicating between said large-diameter portion of said bore and said clearance;

a mushroom shaped member extending into said valve member at said inlet side of said body and resiliently mounted thereon, said mushroom-shaped member defining a valve seat engageable by said valve member for blocking flow between said inlet side and said outlet side; and an auxiliary pilot valve radially communicating with said annular clearance for controlling axial displacement of said valve member.

11. The flow-control valve defined in claim 10 wherein said valve member has an outer periphery provided with a toothed profile in axial section defining said throttle gap.

12. The flow-control valve defined in claim 10, further comprising a sleeve connected to said housing and extending axially into said valve member at said inlet end and provided with an outwardly beveled edge strippingly juxtaposed with an inner wall of said valve member while defining an extension of said gap with said valve member.

* * * * *